(12) United States Patent
Chiu

(10) Patent No.: US 11,747,547 B2
(45) Date of Patent: Sep. 5, 2023

(54) BACKLIGHT MODULE

(71) Applicant: ASUSTeK COMPUTER INC., Taipei (TW)

(72) Inventor: Lin-Wei Chiu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/964,043

(22) Filed: Oct. 12, 2022

(65) Prior Publication Data

US 2023/0204847 A1    Jun. 29, 2023

(30) Foreign Application Priority Data

Dec. 28, 2021    (TW) .................................. 110149086

(51) Int. Cl.
*G02B 6/00*    (2006.01)
*F21V 8/00*    (2006.01)

(52) U.S. Cl.
CPC .................. *G02B 6/0073* (2013.01)

(58) Field of Classification Search
CPC .................................................. G02B 6/00–96
See application file for complete search history.

(56) References Cited

U.S. PATENT DOCUMENTS

| 6,139,163 | A | * | 10/2000 | Satoh | ..................... | G02B 6/002 |
| | | | | | | 362/298 |
| 10,203,082 | B2 | * | 2/2019 | Kawabata | ............. | F21S 43/249 |
| 2005/0276566 | A1 | * | 12/2005 | Iimura | ................. | G02B 6/0048 |
| | | | | | | 385/146 |
| 2006/0083028 | A1 | * | 4/2006 | Sun | ...................... | G02B 6/0065 |
| | | | | | | 362/615 |
| 2006/0262563 | A1 | * | 11/2006 | Xu | ....................... | G02B 6/0016 |
| | | | | | | 362/615 |
| 2006/0285356 | A1 | * | 12/2006 | Tseng | ................... | G02B 6/0016 |
| | | | | | | 362/613 |
| 2013/0235300 | A1 | * | 9/2013 | Zhou | ..................... | G02B 6/0068 |
| | | | | | | 349/62 |
| 2013/0322111 | A1 | * | 12/2013 | Nishitani | ............. | G02B 6/0011 |
| | | | | | | 362/603 |
| 2015/0023056 | A1 | * | 1/2015 | Fang | .................... | G02B 6/0015 |
| | | | | | | 362/609 |
| 2017/0329077 | A1 | * | 11/2017 | Kao | ..................... | G02B 6/0088 |

FOREIGN PATENT DOCUMENTS

| CN | 201956396 | | 8/2011 | | |
| CN | 106842407 | | 6/2017 | | |
| CN | 108368982 | A * | 8/2018 | ............. | F21S 43/14 |
| CN | 212108262 | | 12/2020 | | |
| TW | 201627964 | | 8/2016 | | |
| WO | WO-2015086925 | A2 * | 6/2015 | ............. | B60K 35/00 |

\* cited by examiner

*Primary Examiner* — Gerald J Sufleta, II
(74) *Attorney, Agent, or Firm* — JCIPRNET

(57) ABSTRACT

A backlight module includes a light guide plate and a plurality of light-emitting elements. The light guide plate includes a light-incident surface, an effective light-exiting region, a transition region located between the light-incident surface and the effective light-exiting region, and a light-blocking opening disposed in the transition region. The light-emitting elements are disposed at the light-incident surface and emit light toward the effective light-exiting region. The light-blocking opening is located between a plurality of light-emitting regions formed in the transition region by the plurality of light-emitting elements respectively.

10 Claims, 7 Drawing Sheets

BACKLIGHT MODULE

CROSS-REFERENCE TO RELATED APPLICATION

This application claims the priority benefit of Taiwan application serial No. 110149086, filed on Dec. 28, 2021. The entirety of the above-mentioned patent application is hereby incorporated by reference herein and made a part of the specification.

BACKGROUND OF THE INVENTION

Field of the Invention

The disclosure relates to a backlight module.

Description of the Related Art

Currently, there are increasingly high requirements on the appearance of electronic products. For the sake of beauty, some electronic products illuminate different blocks of light-existing regions with colored lights of different colors for decorative and/or indicative purposes. In this method, a plurality of light-emitting elements (in an embodiment, light-emitting diodes) generating colored lights of different colors is generally disposed on a light guide plate, and a specific distance is maintained between the light-emitting elements.

However, the colored lights generated by the light-emitting diodes gradually diffuse outward at a specific angle when being projected outward. Therefore, the colored lights of different colors of the light-emitting diodes overlap with each other in adjacent regions on the light guide plate, so that an effect of color mixing is caused, which reduces color purity and cannot achieve an expected visual effect.

BRIEF SUMMARY OF THE INVENTION

According to an aspect of the disclosure, a backlight module is provided. The backlight module includes a light guide plate and a plurality of light-emitting elements. The light guide plate includes a light-incident surface, an effective light-exiting region, a transition region located between the light-incident surface and the effective light-exiting region, and a light-blocking opening disposed in the transition region. The plurality of light-emitting elements is disposed on the light-incident surface and emits light toward the effective light-exiting region. The light-blocking opening is located between the plurality of light-emitting elements, and located between a plurality of light-emitting regions formed in the transition region by the plurality of light-emitting elements respectively.

Based on the above, the light guide plate of the backlight module of the disclosure includes the light-blocking opening, disposed in the transition region of the light guide plate and located between adjacent two light-emitting elements. In such configuration, the light-blocking opening reduces a problem that colored lights of different colors emitted by the adjacent two light-emitting elements diffuse to both sides and overlap and interfere with each other, thereby alleviating a situation of color mixing caused by colored lights of different colors emitted by the light-emitting elements. Therefore, the backlight module of the disclosure prevents the different colored lights emitted by the light-emitting elements from overlapping and mixing together, so as to be clearly projected on the effective light-exiting region. By presenting the colored lights of different colors, visual experience of a user is enhanced, and an electronic device using the backlight module is beautified.

DETAILED DESCRIPTION OF THE EMBODIMENTS

Figure 1:
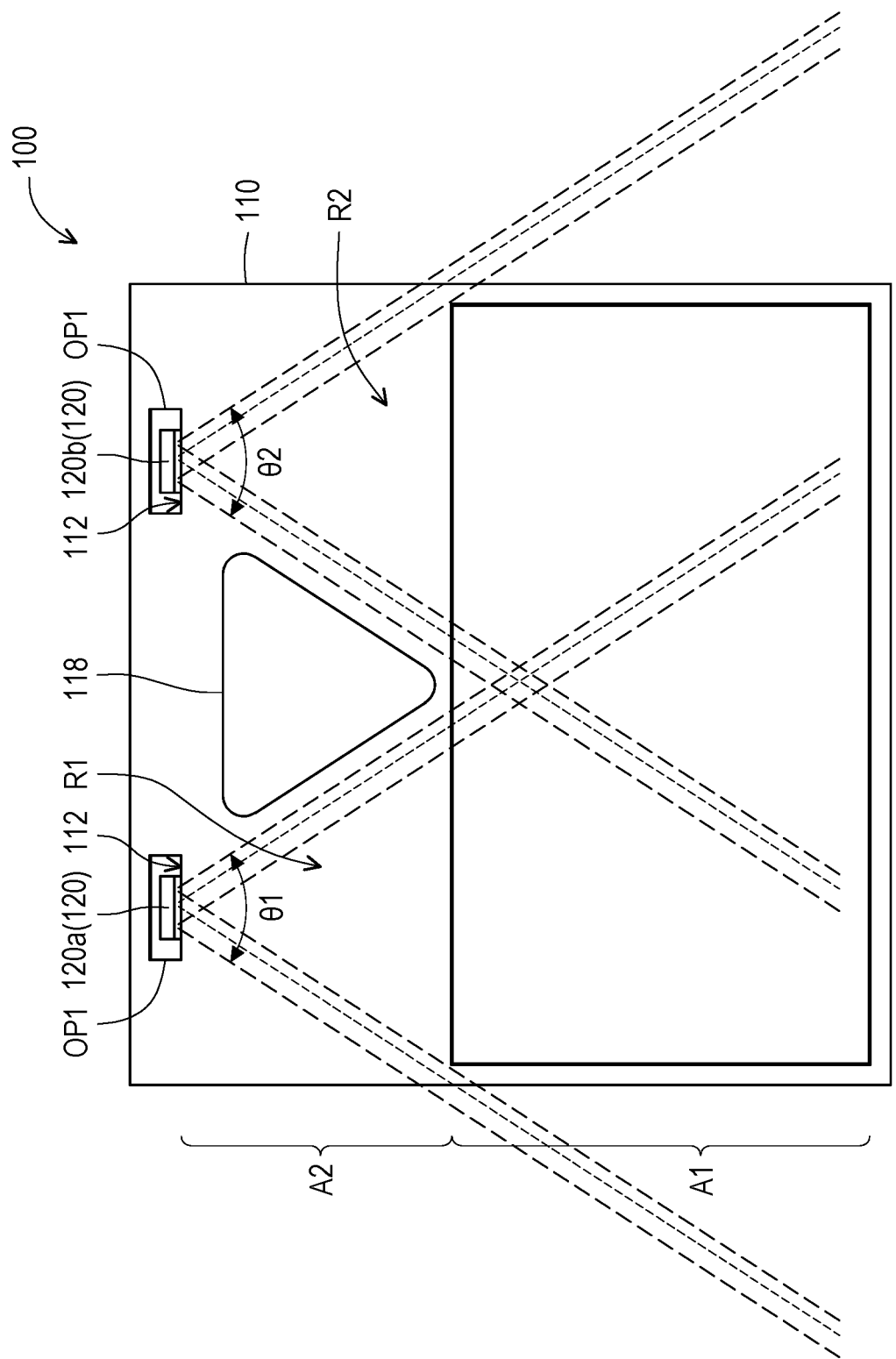
FIG. 1 is a schematic top view of a backlight module according to an embodiment of the disclosure.

Reference is now made in detail to exemplary embodiments of the disclosure, and examples of the exemplary embodiments are described in the accompanying drawings. Whenever possible, the same element symbols are used in the drawings and descriptions to indicate the same or similar parts.

Referring to FIG. 1, in some embodiments, a backlight module 100 includes a light guide plate 110 and a plurality of light-emitting elements 120 (shown as two light-emitting elements 120). In this embodiment, the backlight module 100 is applicable to an electronic device. In an embodiment, the electronic device is a device such as a notebook computer, and the backlight module 100 is disposed in a shell of the electronic device, so as to provide a light source for a light-transmissive region of the electronic device. In some embodiments, the light-emitting elements 120 are light-emitting diodes or another suitable point light source, and the light guide plate 110 is configured to receive light emitted by the light-emitting elements 120 and export the light.

Referring to FIG. 1, in this embodiment, the light guide plate 110 includes at least one light-incident surface 112, and the light-emitting elements 120 (including light-emitting elements 120*a* and 120*b*) are disposed on the light-incident surface 112, to emit incident light toward the light guide plate 110. In this embodiment, the plurality of light-emitting elements 120 is buried in a plurality of light-incident surfaces 112, that is, the light guide plate 110 includes a plurality of embedded openings OP1 to embed the light-emitting elements 120*a* and 120*b* in the embedded openings OP1 respectively. In other embodiments, the light-emitting elements 120*a* and 120*b* are also directly disposed on a side surface or any surface of the light guide plate 110. Whichever configuration is used, one side of a light-exiting surface of the light guide plate 110 facing the light-emitting elements 120*a* and 120*b* is regarded as the light-incident surface 112 of the light guide plate 110.

In this embodiment, the light guide plate 110 further includes an effective light-exiting region A1, a transition region A2, and a light-blocking opening 118. The effective light-exiting region A1 is located on a light-exiting surface 116 of the light guide plate 110, and the transition region A2 is located between the light-emitting elements 120 and the effective light-exiting region A1. In this embodiment, the light emitted by the light-emitting elements 120 is totally reflected in the transition region A2, that is, reflected between a lower surface 114 of the light guide plate 110 and the light-exiting surface 116. The light-emitting elements 120a and 120b are disposed on the light-incident surface 112 and are guided by the light guide plate to emit light toward the effective light-exiting region A1. In an embodiment, the transition region A2 is located between the light-incident surface 112 and the effective light-exiting region A1. Generally, because the transition region A2 is closer to the light-emitting elements 120a and 120b, the transition region A2 has bright/dark band distribution with stronger contrast. In the effective light-exiting region A1 farther away from the light-emitting elements 120a and 120b, because the light emitted by the light-emitting elements 120 has diffused relatively uniformly, the effective light-exiting region A1 is used as a practical region for providing a surface light source.

Figure 2:
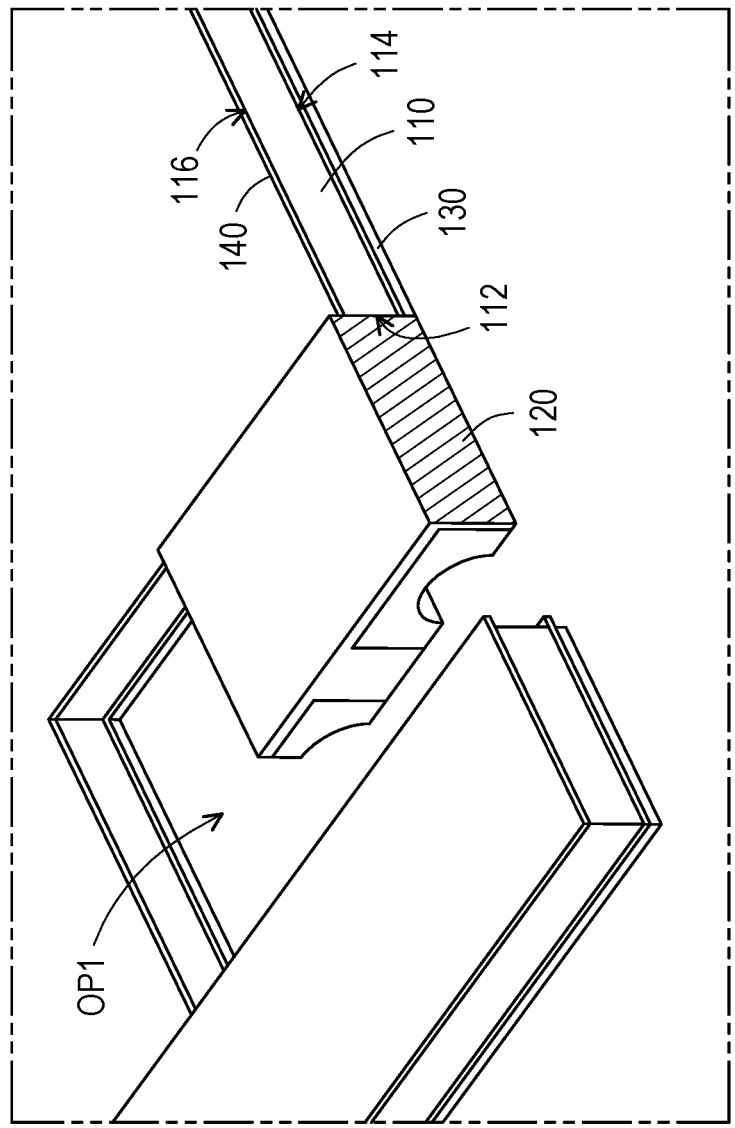
FIG. 2 is a schematic three-dimensional view of a backlight module according to another embodiment of the disclosure.

Referring to FIG. 2, in this embodiment, the light-emitting elements 120 are also embedded in the embedded openings OP1 of the light guide plate 110, and the backlight module 100 further includes a reflective layer 130. The reflective layer 130 is disposed on the lower surface 114 that forms an included angle with the light-incident surface 112 of the light guide plate 110, and an upper surface opposite to the lower surface 114 is regarded as the light-exiting surface 116 of the light guide plate 110. In such configuration, after the light emitted by the light-emitting elements 120 enters an interior of the light guide plate 110 through the light-incident surface 112, the light travelling in the interior of the light guide plate 110 is guided to the light-exiting surface 116 after being reflected by the reflective layer 130, so that the light leaves the light guide plate 110 through the light-exiting surface 116 and is emitted.

Figure 3:
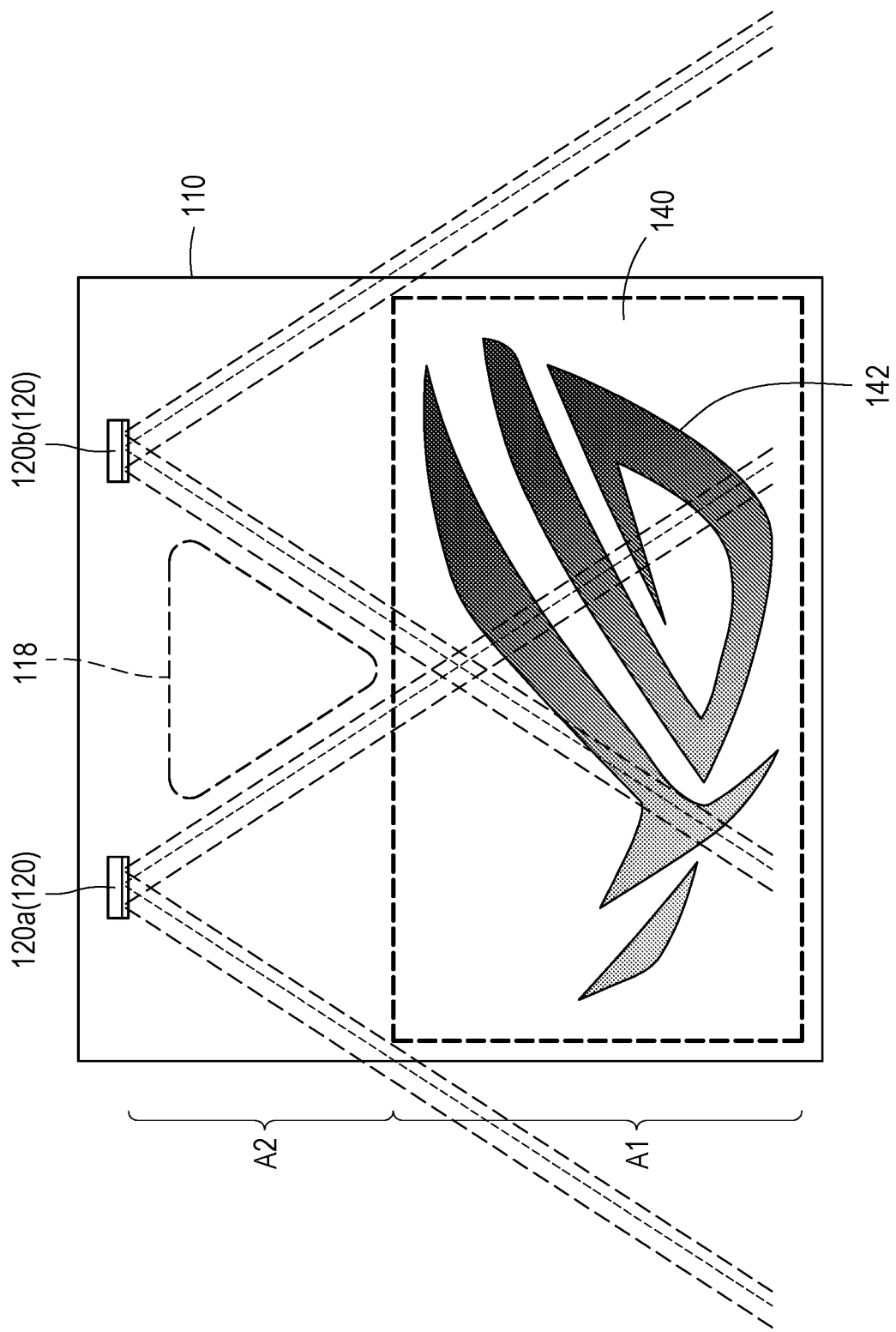
FIG. 3 is a schematic top view of a backlight module according to an embodiment of the disclosure.

FIG. 3 is a schematic top view of a backlight module according to an embodiment of the disclosure. Referring to FIG. 2 and FIG. 3 together, in this embodiment, the backlight module 100 further includes a pattern layer 140, and the pattern layer 140 is disposed on the light guide plate 110 and includes a light-transmissive pattern 142. In an embodiment, the light-transmissive pattern 142 is disposed on the effective light-exiting region A1. In other embodiments, the pattern layer 140 is disposed on a shell (an appearance piece) of the electronic device using the backlight module 100. In an embodiment, the pattern layer 140 is disposed on a back cover of a mobile phone (an electronic device). In this embodiment, regions other than the light-transmissive pattern 142 of the pattern layer 140 are light-proof or have a lower light-transmissive degree relative to the light-transmissive pattern 142. In this way, the pattern layer 140 is designed to transmit light in some regions (in an embodiment, the light-transmissive pattern 142), to present a visual pattern style. In this embodiment, the light-transmissive pattern 142 is a brand logo of an electronic device or another pattern to be displayed through backlight.

In this embodiment, the light-emitting elements 120 are disposed on a same side of the effective light-exiting region A1 (the light-transmissive pattern 142), and colors of light emitted by adjacent two (in an embodiment, the light-emitting elements 120a and 120b) of the plurality of light-emitting elements 120 are different. In an embodiment, the color of the colored light emitted by the light-emitting element 120a is red, and the color of the colored light emitted by the light-emitting element 120b is blue, so as to present an effect of red light and blue light on the effective light-exiting region A1 (the light-transmissive pattern 142). In some embodiments, the light-blocking opening 118 is disposed in the transition region A2, and is located between the light-emitting elements 120a and 120b, so that the different colored lights emitted by the light-emitting elements 120a and 120b do not overlap and mix together, so as to be clearly projected on the effective light-exiting region A1 (the light-transmissive pattern 142). By presenting the colored lights of different colors, visual experience of a user is enhanced, and an electronic device using the backlight module is beautified.

Specifically, in an embodiment, the light-blocking opening 118 is located between light-emitting regions R1 and R2 formed in the transition region A2 by the light-emitting elements 120a and 120b respectively. In this embodiment, from the direction of the top view, the light-blocking opening 118 is triangular, and a top corner of the light-blocking opening 118 is toward the effective light-exiting region A1. In addition, the triangular light-blocking opening 118 includes at least one arc chamfer. In this embodiment, the light-emitting regions R1 and R2 are ranges covered by half intensity angles θ1 and θ2 of the corresponding light-emitting elements 120a and 120b in the transition region A2. Generally, the half intensity angle is an included angle at which a peak value is reduced from both sides to half of the peak intensity in light intensity distribution of a light-emitting element. Therefore, the light-blocking opening 118 is disposed between the ranges covered by the half intensity angles θ1 and θ2 in the transition region A2, so that overlapping and interference between the colored lights of different colors emitted by the adjacent light-emitting elements 120a and 120b in regions other than the half intensity angles are reduced, thereby alleviating a problem of color mixing caused by the adjacent light-emitting elements 120a and 120b.

In some embodiments, angle ranges of the half intensity angles θ1 and θ2 are variable according to a material and a refractive index of the light guide plate 110. In an embodiment, if the material of the light guide plate 110 is poly (methyl methacrylate) (PMMA) and the refractive index is about 1.491, the half intensity angles of the light emitted by the light-emitting elements 120 after entering the light guide plate 110 are about +/−33 degrees (where the peak value of the light intensity distribution of the light-emitting elements is 0 degrees), that is, the half intensity angles θ1 and θ2 are about 66 degrees. If the material of the light guide plate 110 is polycarbonate (PC) and the refractive index is about 1.59, the half intensity angles of the light emitted by the light-emitting elements 120 after entering the light guide plate 110 are about +/−35.5 degrees (where the peak value of the light intensity distribution of the light-emitting elements is 0 degrees), that is, the half intensity angles θ1 and θ2 are about 71 degrees. In this embodiment, the half intensity angles range from +/−30 degrees to +/−40 degrees. In other words, the half intensity angles θ1 and θ2 approximately range from 60 degrees to 80 degrees.

FIG. 4 to FIG. 7 are schematic top views of backlight modules according to different embodiments of the disclosure. It should be noted herein that backlight modules 100a, 100b, 100c, and 100d of FIG. 4 to FIG. 7 are similar to the backlight module 100 of the foregoing embodiments. Therefore, this embodiment uses reference numerals and some content of the foregoing embodiments, where same reference numerals are used to represent same or similar elements, and descriptions about same technical content are omitted. For the descriptions of the omitted parts, reference is made to the foregoing embodiments, and the descriptions are not repeated in this embodiment. Differences between the backlight modules 100a, 100b, 100c, and 100d of FIG. 4 to FIG. 7 and the backlight module 100 of the foregoing embodiments are described below.

Figure 4:
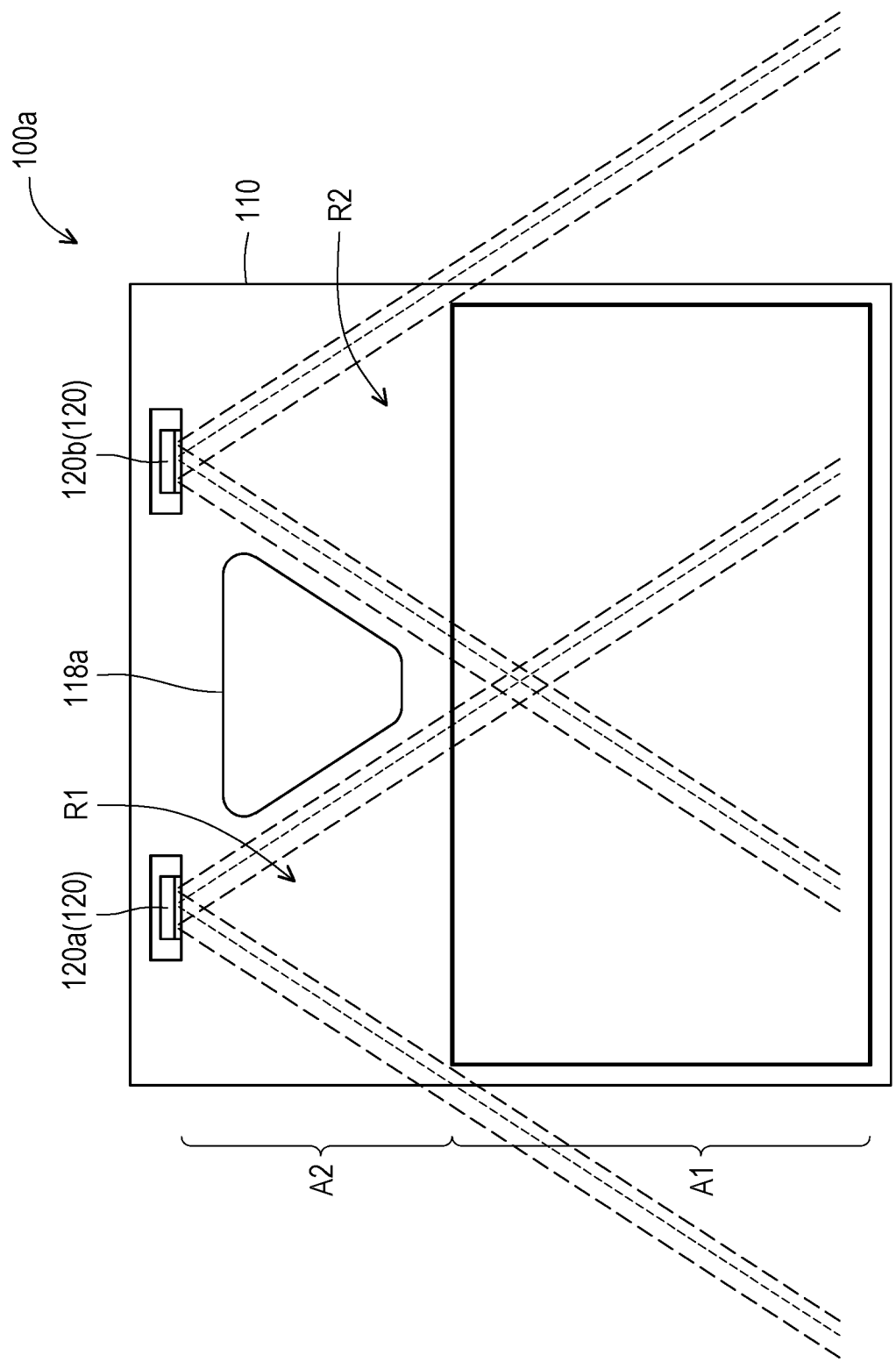
FIG. 4 to FIG. 7 are schematic top views of backlight modules according to different embodiments of the disclosure.

In some embodiments, from the direction of the top view, the light-blocking opening is polygonal. In an embodiment, the polygonal light-blocking opening includes at least one arc chamfer. Referring to FIG. 4 first, in this embodiment, from the direction of the top view, the light-blocking opening 118 is trapezoid, and a short edge of the light-blocking opening 118 is toward the effective light-exiting region A1. In other embodiments, the light-blocking opening 118 is also in a square or another suitable polygonal shape.

Figure 5:
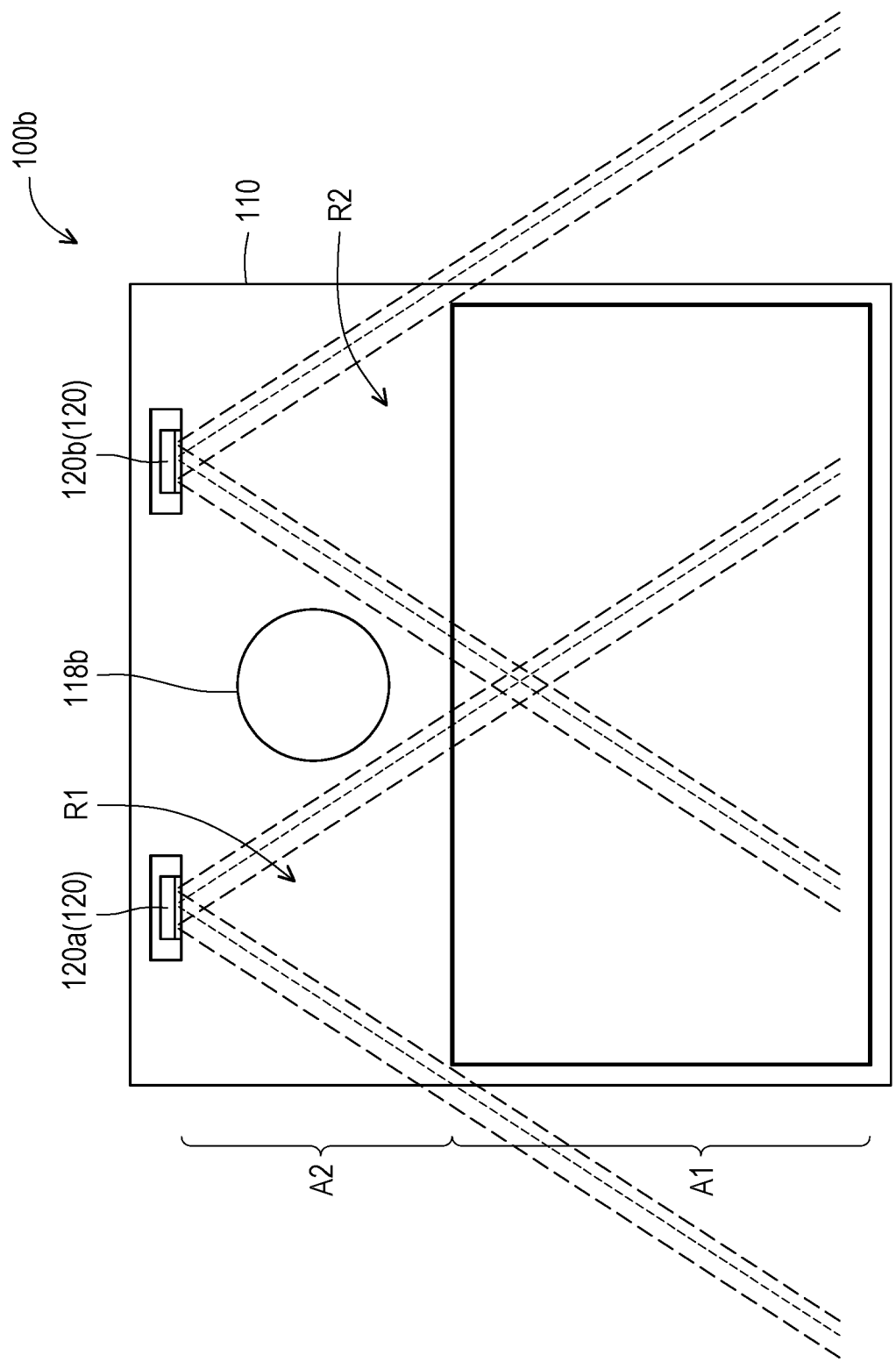

Referring to FIG. 5, in this embodiment, from the direction of the top view, the light-blocking opening 118 is circular. In this embodiment, the light-blocking opening 118 extends through the entire light guide plate 110. In an embodiment, the light-blocking opening 118 further extends through the reflective layer 130. In other embodiments, when the light-blocking opening 118 does not completely penetrate the entire light guide plate 110, a light-blocking effect is also achieved to some extent. In addition, the disclosure only illustrates two light-emitting elements 120a and 120b matching one light-blocking opening 118 as an example. It should be understood that more light-emitting elements 120 are disposed on the light-incident surface of the light guide plate 110, the light guide plate 110 correspondingly includes a plurality of light-blocking openings 118, and the light-blocking openings 118 are respectively disposed between adjacent light-emitting elements 120, so as to reduce a problem of overlapping and interference between the colored lights of different colors emitted by adjacent light-emitting elements 120 in the transition region A2.

Figure 6:
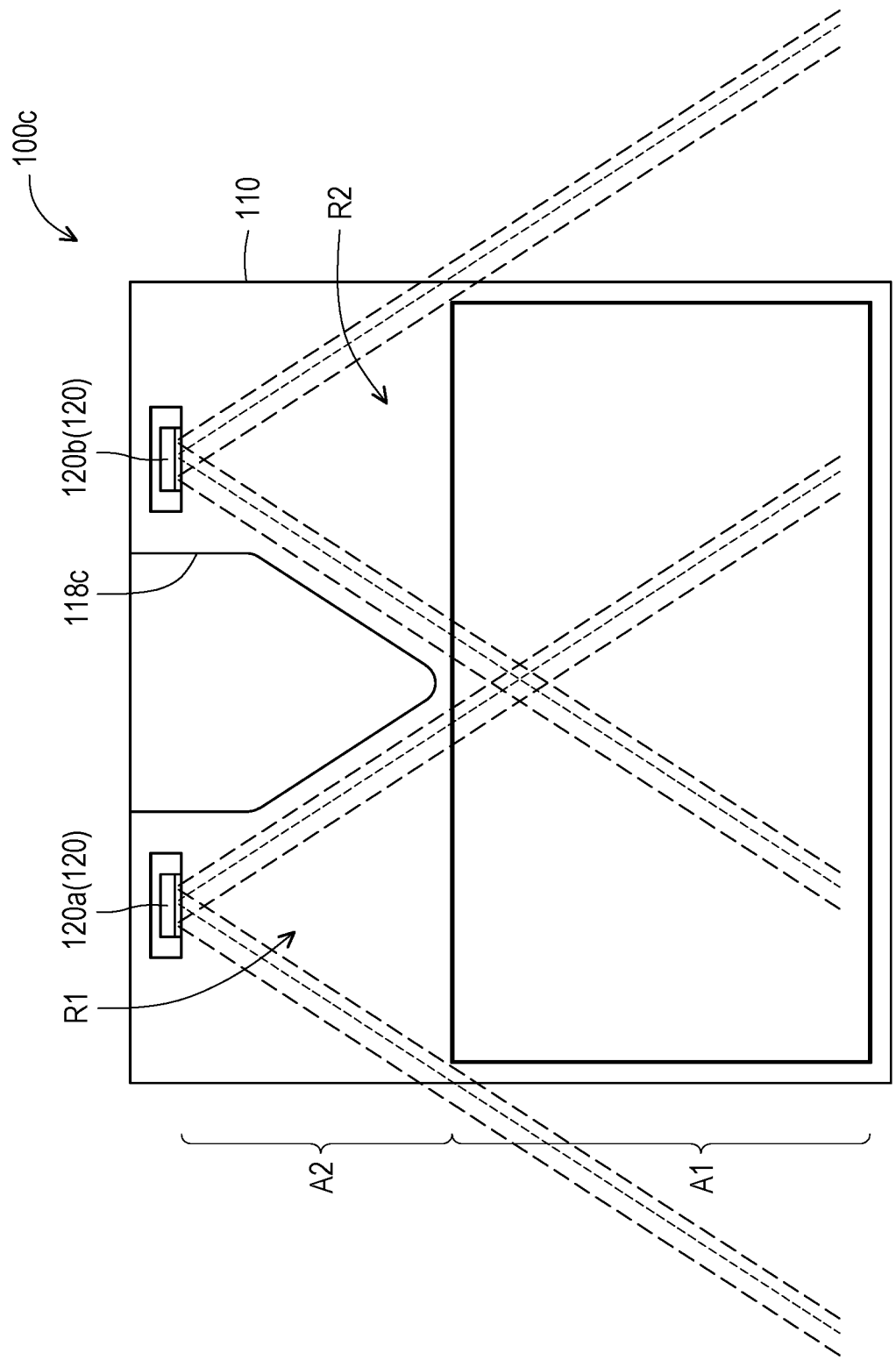

Referring to FIG. 6, in this embodiment, the light-blocking openings 118c extend from the transition region A2 into the light-incident surface 112 of the light guide plate 110. Further, the light-blocking openings 118c extend from the transition region A2 toward the light-emitting elements 120 into an edge of the light guide plate 110, so as to further block interference of different colored lights between adjacent two light-emitting elements 120. In an embodiment, widths of parts of the light-blocking openings 118c close to the edge of the light guide plate 110 are substantially the same, while widths of parts of the light-blocking openings 118c close to the effective light-exiting region A1 gradually decrease from the transition region A2 to the effective light-exiting region A1. In other words, from the direction of the top view, parts of the light-blocking openings 118c from the transition region A2 to the light guide plate 110 are rectangular, while parts of the light-blocking openings 118c from the transition region A2 to the effective light-exiting region A1 are (invertedly) triangular. Definitely, this embodiment is only applicable to descriptions by giving examples.

Figure 7:
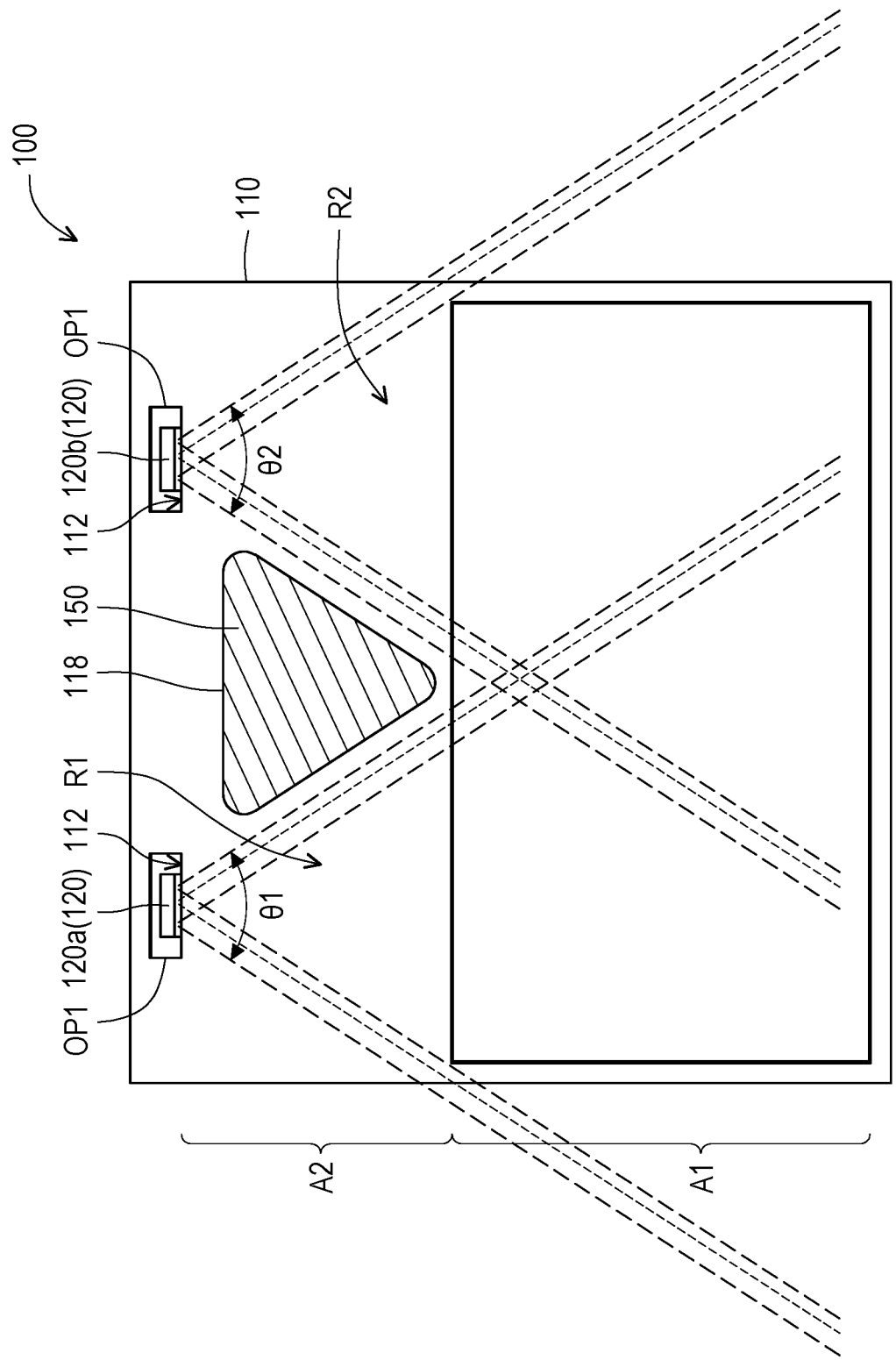

Referring to FIG. 7, in this embodiment, the backlight module 100d further includes a light-shielding material 150 disposed in the light-blocking opening 118, to further block interference of different colored lights between adjacent two light-emitting elements 120. In an embodiment, the light-shielding material 150 includes any dark (black) light-shielding material such as PC or foam. In this embodiment, the light-shielding material 150 is filled in the light-blocking opening 118. In an alternative embodiment, the light-shielding material 150 is a black coating (ink), and is coated on an inner surface of the light-blocking opening 118, to absorb light. Definitely, this embodiment is only applicable to descriptions by giving examples.

In summary, the light guide plate of the backlight module of the disclosure includes the light-blocking opening, disposed in the transition region of the light guide plate and located between adjacent two light-emitting elements. In such configuration, the light-blocking opening reduces a problem that colored lights of different colors emitted by the adjacent two light-emitting elements diffuse to both sides and overlap and interfere with each other, thereby alleviating a situation of color mixing caused by colored lights of different colors emitted by the light-emitting elements. Therefore, the backlight module of the disclosure prevents the different colored lights emitted by the light-emitting elements from overlapping and mixing together, so as to be clearly projected on the effective light-exiting region. By presenting the colored lights of different colors, visual experience of a user is enhanced, and an electronic device using the backlight module is beautified.

What is claimed is:

1. A backlight module, comprising:
   a light guide plate, comprising a light-incident surface, an effective light-exiting region, a transition region located between the light-incident surface and the effective light-exiting region, and a light-blocking opening disposed in the transition region; and
   a plurality of light-emitting elements, disposed on the light-incident surface and emitting light toward the effective light-exiting region, wherein the light-blocking opening is located between adjacent two of the plurality of light-emitting elements, and located between adjacent two of a plurality of light-emitting regions formed in the transition region by the plurality of light-emitting elements respectively;
   wherein each of the plurality of light-emitting regions is a range covered by a half intensity angle of each of the plurality of corresponding light-emitting elements in the transition region.

2. The backlight module according to claim 1, further comprising a pattern layer, disposed on the light guide plate and comprising a light-transmissive pattern.

3. The backlight module according to claim 2, wherein the light-transmissive pattern is disposed on the effective light-exiting region.

4. The backlight module according to claim 2, wherein the plurality of light-emitting elements is disposed on a same side of the light-transmissive pattern.

5. The backlight module according to claim 1, wherein colors of light emitted by adjacent two of the plurality of light-emitting elements are different.

6. The backlight module according to claim 1, wherein the light-blocking opening extends to the light-incident surface from the transition region.

7. The backlight module according to claim 1, wherein the light-blocking opening is polygonal.

8. The backlight module according to claim 1, wherein the light-blocking opening comprises at least one arc chamfer.

9. The backlight module according to claim 1, wherein the light-blocking opening is circular.

10. A backlight module, comprising:
    a light guide plate, comprising a light-incident surface, an effective light-exiting region, a transition region located between the light-incident surface and the effective light-exiting region, and a light-blocking opening disposed in the transition region;
    a plurality of light-emitting elements, disposed on the light-incident surface and emitting light toward the effective light-exiting region, wherein the light-blocking opening is located between adjacent two of the plurality of light-emitting elements, and located between adjacent two of a plurality of light-emitting regions formed in the transition region by the plurality of light-emitting elements respectively; and a light-shielding material, disposed in the light-blocking opening.

\* \* \* \* \*